United States Patent
Voller et al.

(10) Patent No.: US 11,533,001 B2
(45) Date of Patent: Dec. 20, 2022

(54) TRIBOELECTRIC CHARGE HARVESTING DEVICE

(71) Applicant: Oxcion Limited, Abingdon (GB)

(72) Inventors: Stephen David Voller, Oxford (GB); Charles Resnick, Oxford (GB); Anthony Brun, Oxford (GB); Hugh Liam Sutherland, Oxford (GB); Marappa Gounder Rajendran, Oxford (GB)

(73) Assignee: Oxcion Limited, Abingdon (GB)

( * ) Notice: Subject to any disclaimer, the term of this patent is extended or adjusted under 35 U.S.C. 154(b) by 281 days.

(21) Appl. No.: 16/626,550

(22) PCT Filed: Jun. 28, 2018

(86) PCT No.: PCT/GB2018/051821
§ 371 (c)(1),
(2) Date: Dec. 25, 2019

(87) PCT Pub. No.: WO2019/002878
PCT Pub. Date: Jan. 3, 2019

(65) Prior Publication Data
US 2020/0252005 A1 Aug. 6, 2020

(30) Foreign Application Priority Data
Jun. 30, 2017 (GB) .................................... 1710562

(51) Int. Cl.
*H02N 1/06* (2006.01)
*F03G 5/06* (2006.01)
(Continued)

(52) U.S. Cl.
CPC ................. *H02N 1/04* (2013.01); *B64C 3/32* (2013.01); *B64D 41/00* (2013.01); *B64D 45/02* (2013.01);
(Continued)

(58) Field of Classification Search
CPC .......... B64D 41/00; B64D 45/02; H02N 1/04; B64C 3/32; H01G 11/52; H01G 11/36; H01G 11/58; Y02E 60/13; Y02T 50/50
See application file for complete search history.

(56) References Cited

U.S. PATENT DOCUMENTS 7,592,783 B1 * 9/2009 Jarvinen ................... H02N 1/04
290/1 R
2014/0228458 A1 11/2014 Wang et al.
(Continued)

FOREIGN PATENT DOCUMENTS

| EP | 2886464 | 6/2015 |
|---|---|---|
| WO | WO 2011/100232 | 8/2011 |
| WO | WO 2019/002878 | 1/2019 |

OTHER PUBLICATIONS

International Search Report and the Written Opinion dated Mar. 6, 2019 From the International Searching Authority Re. Application No. PCT/GB2018/051821. (9 Pages).
(Continued)

*Primary Examiner* — Jared Fureman
*Assistant Examiner* — Esayas G Yeshaw

(57) ABSTRACT

A device for harvesting and storing triboelectric charge generated on an exterior surface of a moving vehicle is provided. It is characterised by comprising;
 a supercapacitor comprised of nano-carbon-containing electrodes; an ionic liquid electrolyte and at least one ion-permeable porous membrane;
 at least one first element exposed to aerodynamically-induced frictional forces acting thereon and on which the charge is caused to build up and connected to at least one of the electrodes of one polarity;
 at least one second element having a lower electrostatic potential than the charge-collecting element and connected to at least one of the electrodes of the other polarity;

(Continued)

a voltage modification or impedance conversion circuit arranged between the first and/or second elements and the supercapacitor;

means to connect the device to an operative component requiring electrical power and a controller for managing the performance of the device and switching between energy-harvesting and energy-utilisation modes.

The device is especially use for deployment in the wing of an aircraft to utilised triboelectric charge generated thereon.

15 Claims, 3 Drawing Sheets

(51) Int. Cl.
| | | |
|---|---|---|
| *H02J 7/34* | (2006.01) | |
| *H02N 1/04* | (2006.01) | |
| *B64C 3/32* | (2006.01) | |
| *B64D 41/00* | (2006.01) | |
| *B64D 45/02* | (2006.01) | |
| *H01G 11/36* | (2013.01) | |
| *H01G 11/52* | (2013.01) | |
| *H01G 11/58* | (2013.01) | |

(52) U.S. Cl.
CPC .............. *H01G 11/36* (2013.01); *H01G 11/52* (2013.01); *H01G 11/58* (2013.01)

(56) References Cited

U.S. PATENT DOCUMENTS

| | | | |
|---|---|---|---|
| 2014/0338458 A1* | 11/2014 | Wang | H02N 1/04 310/309 |
| 2015/0061375 A1* | 3/2015 | von Heimendahl | B60L 53/52 307/9.1 |
| 2015/0180376 A1* | 6/2015 | Becker | H02N 2/186 310/339 |
| 2018/0091064 A1* | 3/2018 | Johnson | H02N 1/002 |

OTHER PUBLICATIONS

Patents Act 1977: Search Report Under Section 17(5) dated Dec. 22, 2017 From the Intellectual Property Office of the United Kingdom of Great Britain Re. Application No. GB1710562.8. (3 Pages).

* cited by examiner

TRIBOELECTRIC CHARGE HARVESTING DEVICE

RELATED APPLICATIONS

This application is a National Phase of PCT Patent Application No. PCT/GB2018/051821 having International filing date of Jun. 28, 2018, which claims the benefit of priority of United Kingdom Patent Application No. 1710562.8 filed on Jun. 30, 2017. The contents of the above applications are all incorporated by reference as if fully set forth herein in their entirety.

FIELD AND BACKGROUND OF THE INVENTION

The present invention relates to a device suitable for harvesting triboelectric charge from aerodynamically-generated frictional forces acting on the outside of a moving vehicle.

US2015061375 teaches an energy-harvesting member designed and configured to harvest electrical energy generated by a pressure transducer on an aircraft wing in response to a change in altitude or turbulence. A similar approach is adopted in US20120274144.

US20060061107 discloses an energy recovery system from a moving vehicle using a turbine which is driven by the fluid material, for example air, impinging on it.

U.S. Pat. No. 7,592,783 teaches a triboelectric harvester for aircrafts where energy is store in an unspecified capacitor which does not appear to be a supercapacitor.

Other approaches to triboelectric harvesting are taught in US20150180376 and US 20140338458.

We have now designed a system which by virtue of employing the type of lightweight supercapacitors mentioned below are an improvement on the prior; especially in terms power to weight ratio.

SUMMARY OF THE INVENTION

According to the present invention there is provided a device for harvesting and storing triboelectric charge generated on an exterior surface of a moving vehicle characterised by comprising;

- a supercapacitor comprised of nano-carbon-containing electrodes; an ionic liquid electrolyte and at least one ion-permeable porous membrane;
- at least one first element exposed to aerodynamically-induced frictional forces acting thereon and on which the charge is caused to build up and connected to at least one of the electrodes of one polarity;
- at least one second element having a lower electrostatic potential than the charge-collecting element and connected to at least one of the electrodes of the other polarity;
- a voltage modification or impedance conversion circuit arranged between the first and/or second elements and the supercapacitor;
- means to connect the device to an operative component requiring electrical power and
- a controller for managing the performance of the device and switching between energy-harvesting and energy-utilisation modes.

In one embodiment, the device is designed to be attached to or made integral with an exterior body panel of a moving vehicle; for example an exterior surface of any vehicle capable of fast movement including automobiles, trucks, trams, trains, railcars, aircrafts, helicopters, ships or submarines. In another embodiment, the surface is the whole or part of a body panel of an aircraft wing. In another, the surface is one or more aerodynamically-shaped body panels of one of these vehicles. In yet another embodiment, the aerodynamically-induced frictional forces are generated by movement of the body panel through an ubiquitous fluid medium such as water or in particular air. These forces may for example arise because of variations in the characteristics of the fluid; for example the characteristics of the air as determined by local weather conditions. Suitably the triboelectric charge is electrostatic in nature.

In one embodiment of the invention, the nano-carbon-containing electrodes of the supercapacitor comprise anode and cathode surfaces consisting essentially of an electrically-conductive metal current collector in the form of a thin flexible sheet (for example aluminium, silver or copper foil) coated with a layer comprised of carbon charge-carrying elements including nano-carbon components. In another embodiment, at least some of these anode and cathode surfaces are disposed on opposite sides of the same sheet. Suitably, at least some of these charge-carrying elements are particles of carbon having an average longest dimension of less than 10 microns. Preferably, these particles exhibit mesoporosity with the mesopores being in the size range 2 to 50 nanometres. In another embodiment, the carbon charge-carrying elements may be supplemented by nanoparticles of materials which can confer a degree of pseudocapacitance behaviour on the final supercapacitor; for example, salts, hydroxides and oxides of metals such as lithium or transition metals with more than one oxidation state including nickel, manganese, ruthenium, bismuth, tungsten or molybdenum.

In one embodiment, the layer is comprised of carbon particles embedded in a polymer binder matrix and is characterised by the weight ratio of the particles to the binder being in the range 0.2:1 to 20:1. In another, the binder is electrically conductive. In yet another embodiment, the carbon particles include graphene particles; in yet another they include carbon nanotubes. In one preferred embodiment a mixture of graphene and carbon nanotubes are employed optionally with activated carbon being present. In another suitable embodiment, the carbon particles comprise a mixture of these three components with the activated carbon, carbon nanotubes and graphene being present in the weight ratio 0.5-2000:0.5-100:1; preferably 0.5-1500:0.5-80:1.

By the term activated carbon is meant any amorphous carbon of high purity whose surface area is typically greater than 500 $m^2\ g^{-1}$ preferably from 1500 to 2500 $m^2\ g^{-1}$ and which has an average particle size of less than 1 micron. Such materials are readily available from a number of commercial sources. The carbon nanotubes used typically have an average length in the range 2-500 microns (preferably 100-300 microns) and an average diameter in the range 100-150 nanometres. The nanotubes may be single- or multi-walled or a mixture of both.

By the term graphene is meant the allotrope of carbon whose particles are substantially two-dimensional in structure. In extremis these particles comprise single atomic-layer platelets having a graphitic structure although for the purposes of this invention this component may comprise a small number of such platelets stacked one on top of another e.g. 1 to 20 preferably 1 to 10 platelets. In one embodiment, these platelets are in a non-oxidised form. In another, the platelets independently have average dimensions in the range 1 to 4000 nanometres preferably 20 to 3000 or 10 to 2000 nanometres as measured by transmission electron microscopy. Any known method can be used to manufacture such materials which are also available commercially; for example, under the name Elicarb® by Thomas Swann Limited in the United Kingdom.

In another embodiment, the carbon charge-carrying elements may further include up to 20%, preferably 1 to 20% by weight of a conducting carbon. Suitably, this conducting carbon comprises a highly conductive non-graphitic carbon having a polycrystalline structure and a surface area in the range 1 to 500 $m^2\ g^{-1}$. In one embodiment it is a carbon black; for example, one of those material which have been used as conducting additive in in lithium-ion batteries (for example Timcal SuperC65® and/or Timcal SuperC45).

In one embodiment, the residual moisture in the electrodes after the method of the present invention has been carried out should be less than 100 ppm; preferably less than 50 ppm.

In yet another embodiment, the carbon-containing anode(s) and cathode(s) are asymmetric to one another; in other words, they have differing thicknesses—for example layers of differing thicknesses.

Turning to the conductive binder, this is suitably comprised of one or more electrically conductive polymers and is preferably selected from a cellulose derivative, a polymeric elastomer or mixtures thereof. In one embodiment, the cellulose derivative is a carboxyalkyl cellulose for example carboxymethyl cellulose. In another embodiment, the elastomer is a styrene-butadiene rubber or a material having equivalent properties.

Suitably the total charge-bearing surface area of the various components in the composite layer is >250 $m^2\ g^{-1}$ preferably >260 $m^2\ g^{-1}$.

In another embodiment, the electrode is a self-supporting electrode which does not employ a metal current collector and is characterised by comprising a rigid or mechanically resilient, electrically-conductive sheet consisting essentially of a nano-carbon containing matrix of from 75-90% by weight of the activated carbon and 5 to 25% by weight of the conductive carbon uniformly dispersed in from 5 to 15% by weight of a polymer binder. Suitable such sheets will have a density of greater than 0.4 grams per cc, an average gravimetric capacitance in excess of 100 Farads per gram and an equivalent series resistance (ESR) of less than 30 ohms when measured in coin cells.

Turning to the ionic liquid electrolyte, this suitably comprises an organic ionic salt which is molten below 100° C. and is preferably so at or below ambient temperatures. In another embodiment, it is a mixture comprised of one or more ionic liquids and the mixture has a viscosity at 25° C. in the range 10 to 80 centipoise; preferably 20 to 50 centipoise. In yet another embodiment, the electrolyte is a eutectic or near-eutectic mixture of at least two components one of which is an ionic liquid. Suitably these mixtures have a melting point below 100° C. preferably below 50° C.; and more preferably below 30° C. Eutectic behaviour is a well-known characteristic of those mixtures of two or more components whose melting point is significantly depressed over a given composition range relative to what might be expected on the basis of Raoult's law. Here, the term 'eutectic or near-eutectic mixture' is therefore to be construed as encompassing any mixture of components according to the invention whose melting point shows such a depression; with those having a depression greater than 50%, preferably greater than 90% of the depression at the actual eutectic point being most preferred. In an especially preferred embodiment the eutectic composition itself is employed as the electrolyte. In another embodiment at least one of the ionic liquids employed has an electrochemical window greater than 3 v.

In one embodiment, the electrolyte employed is a mixture, e.g. an eutectic or near-eutectic mixture, comprised of at least one of the ionic liquids described in U.S. Pat. No. 5,827,602 or WO2011/100232, to which the reader is directed for a complete listing. In another embodiment mixture consists of a mixture of at least two of the said ionic liquids.

Suitably, the ionic liquid employed or one of the ionic liquids employed in the electrolyte is thus a quaternary salt of an alkyl or substituted-alkyl pyridinium, pyridazinium, pyrimidinium, pyrazinium, imidazolium, piperidinium, pyrrolidinium, pyrazolium, thiazolium, oxazolium, triazolium or azepanium cation. In such a case, it is preferred that the counter-anion associated with each cation is large, polyatomic and has a Van der Waals volume in excess of 50 or 100 angstroms (see for example U.S. Pat. No. 5,827,602 which provides illustrative examples contemplated as being within the scope of our invention). It is also preferred that the anion is chosen so that it is asymmetric with respect to the cation ensuring that the ions in the liquid do not easily close pack and cause crystallisation. In one embodiment, the counter-anion is selected from the group consisting of tetrafluoroborate, hexafluorophosphate, dicyanamide, bis(fluorosulphonyl)imide (FSI), bis(trifluoromethylsulphonyl)imide (TFSI) or bis(perfluoro$C_2$to$C_4$alkylsulphonyl)imide e.g. bis(perfluoroethylsulphonyl)imide anions or analogues thereof. In another preferred embodiment the ionic liquid(s) are selected from $C_1$ to $C_4$ alkyl substituted imidazolium, piperidinium or pyrrolidinium salts of these anions with any permutation of cations and anions being envisaged as being disclosed herein. From amongst this list the following binary systems are preferred: a piperidinium salt and an imidazolium salt; a piperidinium salt and a pyrrolidinium salt and an imidazolium salt and a pyrrolidinium salt. In alternative embodiments, the binary system may comprise either (a) a piperidinium salt and any substituted bulky quaternary ammonium salt of one of the above-mentioned anions; e.g. a tralkyl(alkoxylalkyl)ammonium salt thereof where the alkyl or alkoxy moieties independently have one, two, three or four carbon atoms or (b) one or more of the azepanium salts exemplified WO2011/100232. In all of the cases referred to above, the salts employed should preferably each have an electrochemical window of greater than 3 volts and a melting point below 30° C.

Specific, non-limiting examples of electrolytes which can be employed include salts or mixtures of salts derived from the following cations; 1-ethyl-3-methylimidazolium (EMIM), 1-butyl-3-methylimidazolium (BMIM), 1-methyl-1-propylpyrrolidinium, 1-methyl-1-butylpyrrolidinium and the anions mentioned above. In one embodiment the electrolyte is one or more tetrafluoroborate salts of these cations. In another it is the same salt used in step (a) of the method.

In another embodiment the ionic liquid is a salt of a quaternary ammonium cation such as N,N-diethyl-N-methyl-N-(2-methoxyethyl)ammonium (DEME) and its homologues.

Suitably the water content of the ionic liquid is less than 100 ppm, preferably less than 50 ppm.

The ion-permeable membrane which is located in the electrolyte between adjacent anode and cathode electrodes is suitably made from a polymer or like porous material.

The device of the present invention includes first and second elements which are attached to the supercapacitor and provide the source of electrical potential difference for charging purposes. This potential difference arises from triboelectric charge build either on the surface itself or charge particles attracted thereto. In one embodiment the second element is an uncharged earthing component located within the vehicle. It may for example be a structural part of the vehicle not subject to electrostatic charge build-up. In another embodiment, the second element can be attached to or made integral with an exterior region of the vehicle which either receives little or no triboelectric charge relative to the first element or collects triboelectric charge of opposite polarity. When the device is employed on an aircraft the device itself may be conveniently located within its wing(s) and the first element optionally attached to the conventional static-dissipation pins located thereon. In such a case the second element may be located at a different position on for example the fuselage or cabin interior.

In one embodiment the first element(s) comprise areas on one or more exterior body panels of the vehicle having differing degrees of roughness in order to promote the build-up of triboelectric charge. In this sense the device goes against conventional wisdom where build-up of such charge is seen as something to be actively discouraged. In another embodiment, the first member(s) comprises one or a plurality of dielectric sheets or coated areas attached to or integral with an external surface of the device and having harvesting electrodes attached to or embedded therein. In one embodiment these sheets or coatings are comprised of plastic or dielectric composites able to withstand the operating temperature envelope of the device.

In one embodiment, the vehicle is provided with one or more of the devices each of which may be comprised of a plurality of first and second elements and/or a plurality of supercapacitors connected in series or parallel to provide a significant bank of electrical energy which can be used to provide operative energy or power as required.

The device further includes a voltage modification or impedance conversion circuit arranged between the first and/or second elements and the supercapacitor designed to step-down the high voltages which will be generated by the first and second elements, typically of the order of many thousands of volts, to a level which allows efficient charging of the supercapacitor. In one embodiment, this circuit is a DC to DC converter wherein the associated energy is stored and released from a magnetic field in a transformer or inductor.

The controller is suitably a microprocessor or equivalent circuitry which allows the performance of the supercapacitor to be managed either automatically or with user input. In one embodiment it allows the device to be switched between energy-harvesting and energy-utilisation modes. In another embodiment, it will further include some or all of the following items; a meter or like display to show the charge status of the supercapacitor; a temperature monitor and an alarm so that the user is advised in the event of the device's failure or a safety problem. In another embodiment the device will further include a protection circuit to protect the supercapacitor from voltage surges—for example those generated during an electrical storm or lightning strike. In one embodiment at least the supercapacitor will be contained in a sealed container which is otherwise electrically insulated, inflammable, made of a material resistant to extremes of temperature (both high and low) and which additionally contains a blanket of inert gas such as nitrogen to minimise the risk of fire. The device may further comprise a heater or heating circuit powered by the supercapacitor for maintaining the supercapacitor within its optimum performance temperature range. Such a circuit may be controlled by the controller in response to input from temperature sensors or pressure transducers located on the exterior of the vehicle. In yet another embodiment the device may be provided with wires, brushes or like to discharge excess static charge to the medium passing over it.

The device of the present invention can be used as a primary source of energy when the demands are relatively low; for example to power operative elements such as the control navigational or communications system of the vehicle. Alternatively they may be present as a back-up providing accessible power in emergency situations. The device itself may further include one or more lithium-ion batteries which can be charged by the supercapacitor as required; for example when the vehicle is not in use. In one embodiment at least the supercapacitor and controller are contained within a typical 'black box' recording apparatus enabling it to power a distress beacon for longer than is currently possible.

BRIEF DESCRIPTION OF THE SEVERAL VIEWS OF THE DRAWINGS

The invention will now be illustrated by the following Example, where.

DESCRIPTION OF SPECIFIC EMBODIMENTS OF THE INVENTION

Figure 1:
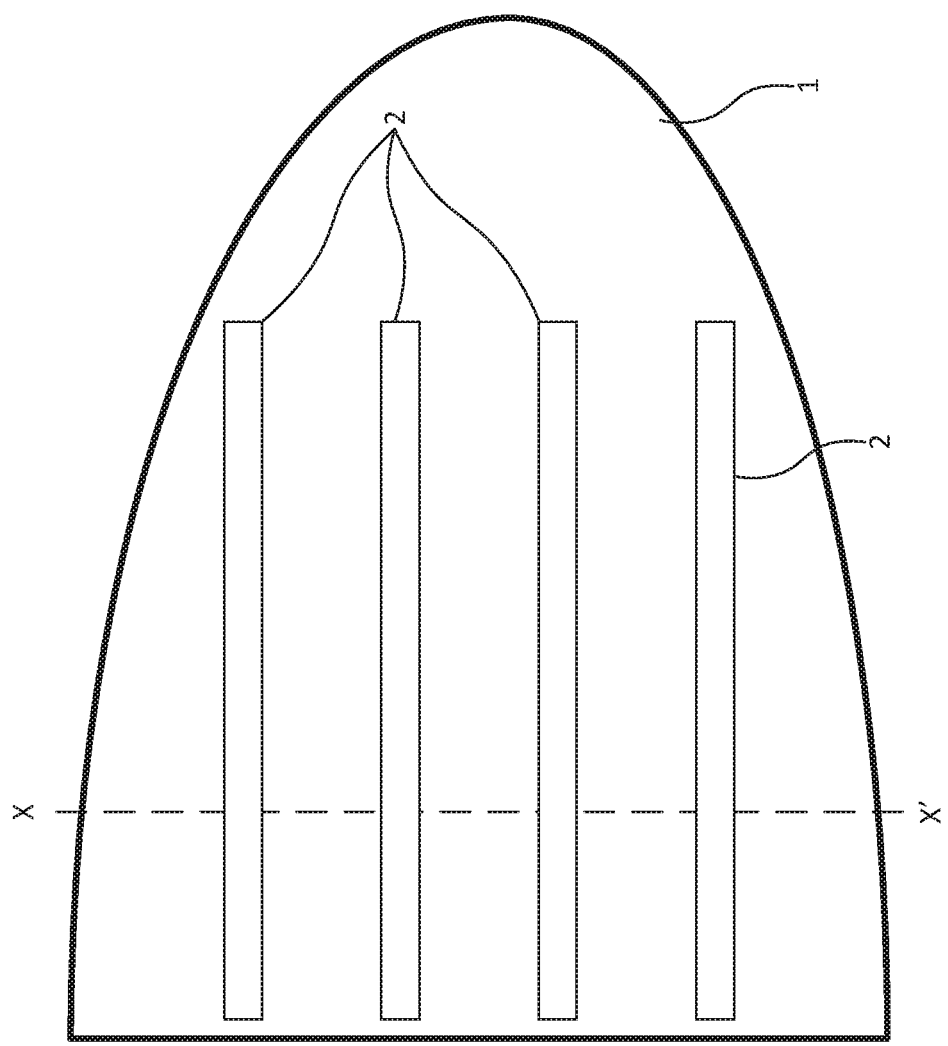
FIG. 1 shows a wing of an airplane having on its upper surface a plurality of charging surfaces.
Figure 2:
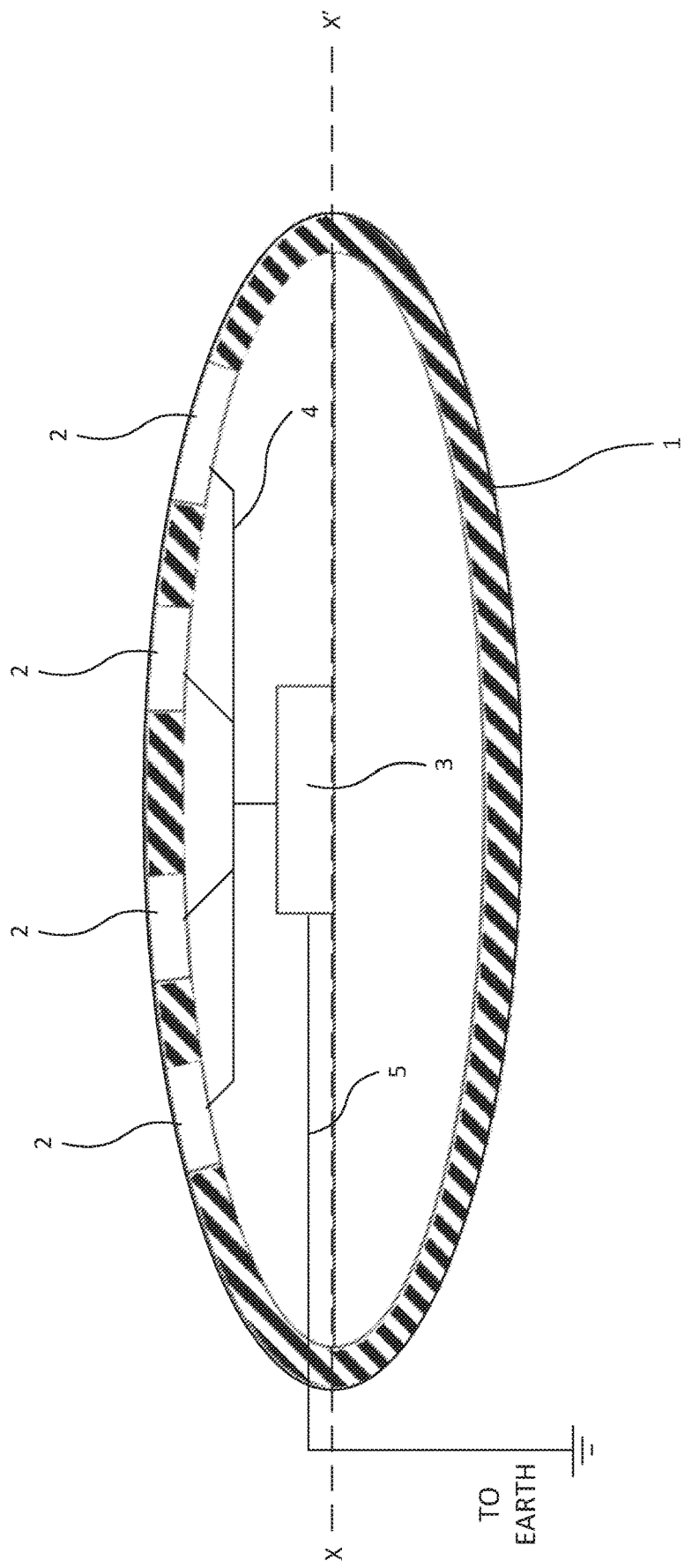
FIG. 2 shows a sectional view of the wing of FIG. 1.
Figure 3:
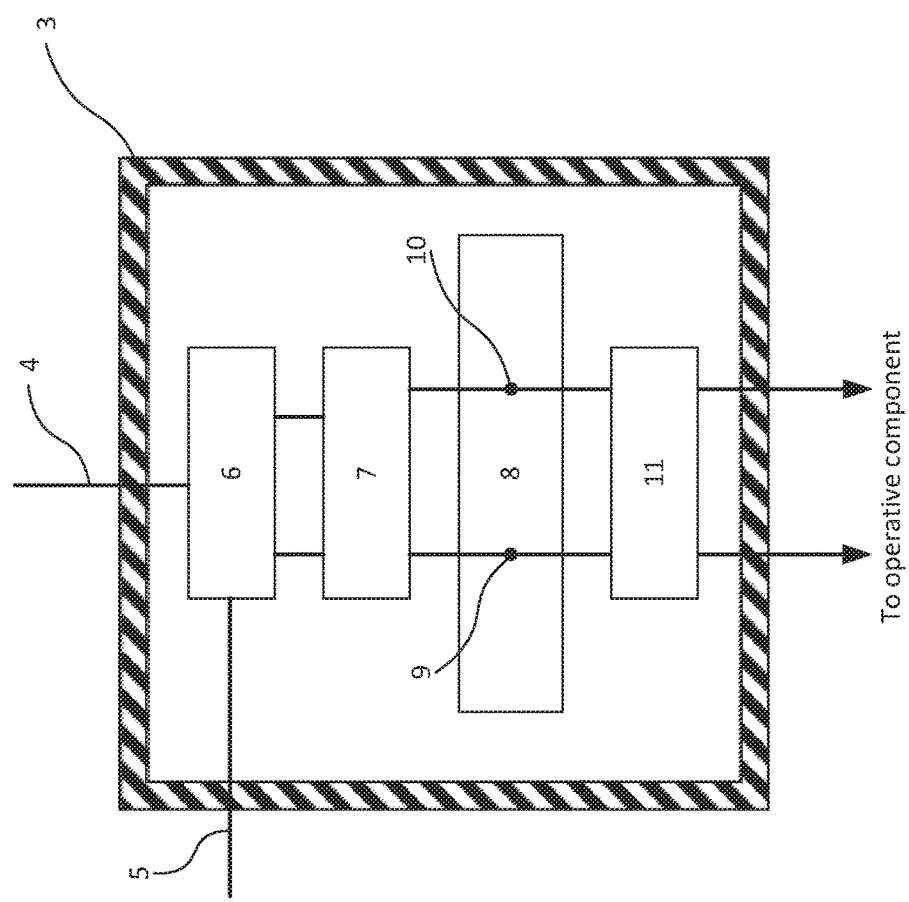
FIG. 3 shows a box made of a resilient composite, which may be connected to a charging surface.

FIG. 1 shows schematically the wing of an airplane 1 having on its upper surface a plurality of charging surfaces 2 (e.g. areas comprised of a dielectric coating) which, relative to the rest of 1, are rough, and capable of collecting charged particles found in the atmosphere at high altitude. FIG. 2 depicts a sectional view of 1 along the plan containing X-X' which reveals that within 1 is located a sealed box 3 made of a resilient composite (for example a mesh reinforced engineering plastic) filled with nitrogen gas and optionally a fire retardant chemical 4. 3 is connected by electrical cables 4 and 5 respectively to for example electrodes in 2 and an uncharged structural member in the inside of the aircraft's fuselage (not shown). FIG. 3 shows the inside of the 3 where the other ends of 4 and 5 are bridged by anti-surge circuit 6 prior to being connected to step-down DC to DC converter 7 and supercapacitor bank 8 comprised of a plurality of supercapacitor cells arranged in series and having nano-carbon-containing anodes and cathodes, an ionic liquid electrolyte of the type specified above and ion-permeable dielectric membranes arranged between the anodes and cathodes. The anodes and cathodes are respectively attached to terminals 9 and 10 on 8 which in turn are connected to 7 and 11. Microprocessor 11 operatively bridges 9 and 10 and is further connected to the aircrafts 'fly by wire' system (not shown) where it is configured to provide back-up power in the event of a failure of the aircraft's main batteries.

What is claimed is:

1. A device for harvesting and storing triboelectric charge generated on an exterior surface of a moving vehicle characterised by comprising;

a supercapacitor cell comprised of nano-carbon-containing electrodes; an ionic liquid electrolyte and at least one ion-permeable membrane;

at least one first element exposed to aerodynamically-induced frictional forces acting thereon and on which the charge is caused to build up and connected to at least one of the electrodes of one polarity;

at least one second element having a lower electrostatic potential than the charge-collecting element and connected to at least one of the electrodes of the other polarity;

a voltage modification or impedance conversion circuit arranged between the first and/or second elements and the supercapacitor;

means to connect the device to an operative component requiring electrical power and a controller for managing the performance of the device and switching between energy-harvesting and energy-utilisation modes.

2. A device claimed in claim 1 characterised in that voltage modification device is a step-down DC to DC converter.

3. A device as claimed in claim 1 characterised in that the vehicle is an aircraft and that the first and second elements are different surface areas of its wing(s) having a different degree or polarity of charging.

4. A device as claimed in claim 3 characterised in that the first element(s) are connected to static dissipation pins on the wing.

5. A device as claimed in claim 3 characterised that the differing surface areas have differing degrees of aerodynamic roughness.

6. A device as claimed in claim 3 characterised in that a plurality of devices are attached to or made integral with the wing.

7. A device as claimed in claim 1 characterised in that the controller is adapted to provide power to one or more of a control, navigational or communication system of the vehicle.

8. A device as claimed in claim 1 characterised by further including a heater or heating circuitry for maintaining the supercapacitor within in optimum operating temperature envelope.

9. A device as claimed in claim 1 characterised by further including protection circuitry to mitigate the effects of voltage surges.

10. A device as claimed in claim 1 characterised in that the components of the device are contained within an inflammable, mechanically and thermally resilient container containing a blanket of inert gas.

11. A device as claimed in claim 1 characterised by further including at least one lithium-ion cell.

12. A device as claimed in claim 1 characterised by further including at least one static discharger on the exterior surface.

13. A method of using a device as claimed in claim 1 to harvest triboelectric charge from a moving vehicle for the purpose of at least in part powering the movement or components of the vehicle.

14. An aircraft wing or a vehicle body panel characterised by including one or more of the devices claimed in claim 1.

15. A aircraft wing or vehicle body panel as claimed in claim 14 characterised in that the device is made integral therewith.

* * * * *

UNITED STATES PATENT AND TRADEMARK OFFICE
CERTIFICATE OF CORRECTION

PATENT NO.        : 11,533,001 B2
APPLICATION NO.   : 16/626550
DATED             : December 20, 2022
INVENTOR(S)       : Stephen David Voller et al.

It is certified that error appears in the above-identified patent and that said Letters Patent is hereby corrected as shown below:

On the Title Page

Item (30) "1710562" should be changed to --1710562.8--

Signed and Sealed this
Twenty-fifth Day of April, 2023

Katherine Kelly Vidal
*Director of the United States Patent and Trademark Office*